United States Patent
Cui et al.

(10) Patent No.: US 11,856,438 B2
(45) Date of Patent: Dec. 26, 2023

(54) MEASUREMENT GAP TIMING FOR NEW RADIO DUAL CONNECTIVITY

(71) Applicant: Apple Inc., Cupertino, CA (US)

(72) Inventors: Jie Cui, San Jose, CA (US); Dawei Zhang, Saratoga, CA (US); Haitong Sun, Cupertino, CA (US); Hong He, San Jose, CA (US); Huaning Niu, San Jose, CA (US); Manasa Raghavan, Sunnyvale, CA (US); Qiming Li, Beijing (CN); Xiang Chen, Campbell, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 274 days.

(21) Appl. No.: 17/593,279

(22) PCT Filed: Jan. 13, 2021

(86) PCT No.: PCT/CN2021/071359
§ 371 (c)(1),
(2) Date: Sep. 14, 2021

(87) PCT Pub. No.: WO2022/150997
PCT Pub. Date: Jul. 21, 2022

(65) Prior Publication Data
US 2023/0171628 A1 Jun. 1, 2023

(51) Int. Cl.
*H04W 24/10* (2009.01)
*H04W 36/00* (2009.01)

(52) U.S. Cl.
CPC .................. *H04W 24/10* (2013.01)

(58) Field of Classification Search
CPC ............. H04W 24/10; H04W 36/0069; H04W 36/0088; H04L 5/001; H04L 5/0098
See application file for complete search history.

(56) References Cited

U.S. PATENT DOCUMENTS 10,021,705 B2 * 7/2018 Franz .................... H04W 72/52
10,045,332 B2 * 8/2018 Kitazoe ............. H04W 56/0015
(Continued)

FOREIGN PATENT DOCUMENTS

| CN | 111108796 | 5/2020 |
| CN | 111247852 | 6/2020 |
| CN | 111937430 | 11/2020 |

OTHER PUBLICATIONS

Huawei, "Introduction of NB-Iot"; 3GPP TSG-RAN WG2 Meeting #93BIS; R2-162310; Apr. 15, 2016; Section 8-10; pp. 1-10, 69-119.

*Primary Examiner* — Ahmed Elallam
(74) *Attorney, Agent, or Firm* — Fay Kaplun & Marcin, LLP

(57) ABSTRACT

A user equipment (UE) is configured to establish a network connection including a new radio (NR)-NR dual connectivity band combination wherein a primary cell (PCell) of a primary cell group (PCG) and a primary secondary cell (PSCell) of a secondary cell group (SCG) both operate on frequency range 1 (FR1) and wherein at least one cell of either the PCG or the SCG operates on frequency range 2 (FR2). The UE receives a measurement gap timing advance parameter, selects one subframe from multiple serving cell subframes and determines a starting point for a configured per-frequency range (FR) measurement gap based on the measurement gap timing advance parameter and the selected subframe.

20 Claims, 13 Drawing Sheets

(56) References Cited

U.S. PATENT DOCUMENTS

| | | | |
|---|---|---|---|
| 10,602,511 B2* | 3/2020 | Huang | H04W 24/02 |
| 11,265,833 B2* | 3/2022 | Vajapeyam | H04W 56/0065 |
| 2015/0327249 A1 | 11/2015 | Kitazoe et al. | |
| 2021/0227413 A1* | 7/2021 | Yang | H04W 56/0045 |
| 2021/0227610 A1* | 7/2021 | Cui | H04W 24/10 |
| 2022/0210675 A1* | 6/2022 | Cui | H04W 36/0069 |

* cited by examiner

MEASUREMENT GAP TIMING FOR NEW RADIO DUAL CONNECTIVITY

BACKGROUND

A user equipment (UE) may connect to a network that supports dual connectivity (DC) to multiple nodes that each provide 5G new radio (NR) access (NR-NR DC). Some band combinations for NR-NR DC may result in frequency range 1 (FR1) and/or frequency range 2 (FR2) being used by both the primary cell group (PCG) and the secondary cell group (SCG). There is a need for mechanisms that enable the UE to determine a measurement gap starting point for a frequency range specific measurement gap when the corresponding frequency range (e.g., FR1 and/or FR2) is used by both the PCG and the SCG.

SUMMARY

Some exemplary embodiments are related to a processor of a user equipment (UE) configured to perform operations. The operations include establishing a network connection, the network connection including a new radio (NR)-NR dual connectivity band combination wherein a primary cell (PCell) of a primary cell group (PCG) and a primary secondary cell (PSCell) of a secondary cell group (SCG) both operate on frequency range 1 (FR1) and wherein at least one cell of either the PCG or the SCG operates on frequency range 2 (FR2), receiving a measurement gap timing advance parameter, selecting one subframe from multiple serving cell subframes and determining a starting point for a configured per-frequency range (FR) measurement gap based on the measurement gap timing advance parameter and the selected subframe.

Other exemplary embodiments are related to user equipment (UE) including a transceiver configured to communicate with a fifth generation (5G) network and a processor communicatively coupled to the transceiver and configured to perform operations. The operations include establishing a network connection, the network connection including a new radio (NR)-NR dual connectivity band combination wherein a primary cell (PCell) of a primary cell group (PCG) and a primary secondary cell (PSCell) of a secondary cell group (SCG) both operate on frequency range 1 (FR1) and wherein at least one cell of either the PCG or the SCG operates on frequency range 2 (FR2), receiving a measurement gap timing advance parameter, selecting one subframe from multiple serving cell subframes and determining a starting point for a configured per-frequency range (FR) measurement gap based on the measurement gap timing advance parameter and the selected subframe.

Still further exemplary embodiments are related to a processor of a user equipment (UE) configured to perform operations. The operations include establishing a network connection, the network connection including a new radio (NR)-NR dual connectivity band combination wherein a primary cell (PCell) of a primary cell group (PCG) and a primary secondary cell (PSCell) of a secondary cell group (SCG) both operate on frequency range 1 (FR1) and wherein at least one cell of either the PCG or the SCG operates on frequency range 2 (FR2), receiving an indication from the network of a serving cell or cell group that is to be used as a reference for determining a per-FR measurement gap starting point and selecting the per-FR starting point.

DETAILED DESCRIPTION

Figure 1:
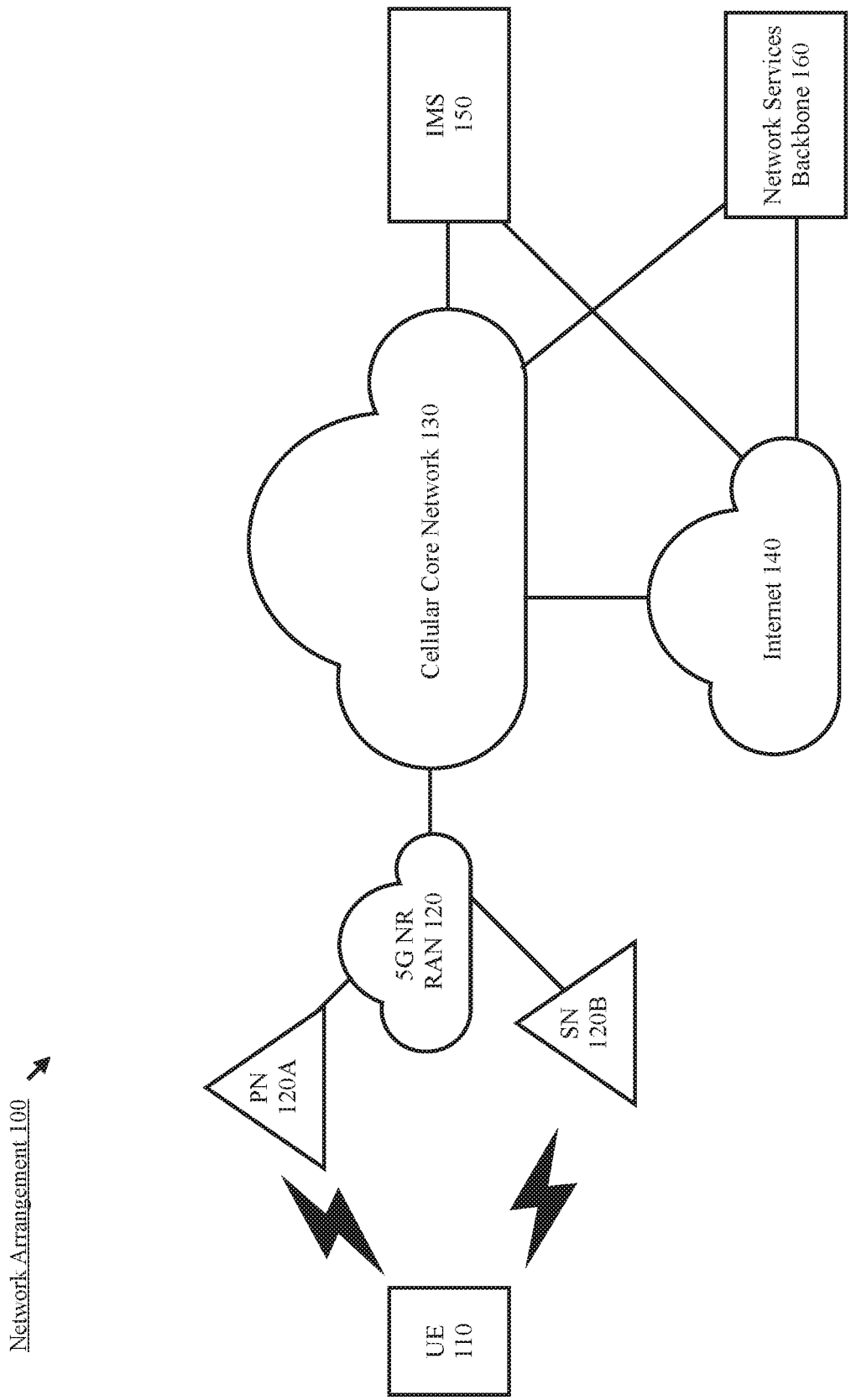
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) configured with dual connectivity (DC) to multiple nodes that each provide 5G new radio (NR) access (NR-NR DC). As will be described in more detail below, the exemplary embodiments further relate to band combinations for NR-NR DC where frequency range 1 (FR1) and/or frequency range 2 (FR2) is used by both the primary cell group (PCG) and the secondary cell group (SCG). The exemplary embodiments include mechanisms configured to enable the UE to determine a measurement gap starting point for a frequency range specific measurement gap when the corresponding frequency range (e.g., FR1 or FR2) is used by both the PCG and the SCG.

The exemplary embodiments are described with regard to a UE. However, reference to a UE is merely provided for illustrative purposes. The exemplary embodiments may be utilized with any electronic component equipped with hardware, software, and/or firmware configured to exchange information and data with the network. Therefore, the UE as described herein is used to represent any electronic component.

The exemplary embodiments are also described with regard to a 5G NR network that supports NR-NR DC. For example, the UE may be connected to a primary node (PN) and a secondary node (SN) that are connected to one another via a non-ideal backhaul. Those skilled in the art will understand that the PN may be one of multiple nodes that form the PCG and the SN may be one of multiple nodes that form the SCG. However, any reference to a particular type of RAN, type of DC or type of node (e.g., cell, base station, transmission reception point (TRP), etc.) is merely provided for illustrative purposes. The exemplary embodiments may apply to any appropriate type of multi-radio access technology (RAT) DC (MR-DC).

5G networks may deploy cells operating on a variety of different frequency bands. The exemplary embodiments relate to cells operating on FR1 and/or FR2. FR1 may include the frequency range of 410 megahertz (MHz) to 7125 MHZ and FR2 may include the frequency range 24250 MHz to 52600 MHZ. These ranges are defined in the third generation partnership (3GPP) technical specification (TS) 38.104. Those skilled in the art will understand FR1 and FR2 may be configured for different types of traffic and/or services. However, the type of traffic and/or service configured for each frequency range is beyond the scope of the exemplary embodiments. Instead, the exemplary embodiments relate to implementing a frequency range specific measurement gap when the corresponding frequency range (e.g., FR1 or FR2) is used by both the PCG and the SCG.

The exemplary embodiments are also described with regard to a measurement gap. Those skilled in the art will understand that the term "measurement gap" generally refers to a time duration during which the UE may collect measurement data corresponding to cells other than a currently configured serving cell. For example, while camped on a cell, the UE may be configured with a measurement gap during which the UE may tune away from the serving cell and scan for signals broadcast by other cells. The UE may collect measurement data based on signals received during the measurement gap. The measurement data collected by the UE may then be used by the UE and/or the network for a variety of different purposes including, but not limited to, cell selection, cell reselection, handover, carrier aggregation (CA), dual connectivity, radio resource management, etc.

During operation, the UE may be configured with a measurement gap pattern. To provide an example, consider a scenario in which a measurement gap pattern is configured with a measurement gap length of (Y) seconds and a repetition period of (X) seconds. Initially, a first measurement gap is triggered. The UE may tune its transceiver to one or more frequencies scanning for signals broadcast by surrounding cells for (Y) seconds. After the expiration of the measurement gap, the UE may tune back to its serving cell. A second measurement gap may be triggered (X) seconds after the first measurement gap. The UE may once again tune its transceiver to one or more frequencies scanning for signals broadcast by surrounding cells for (Y) seconds. The above example is merely provided as a general example of a measurement gap pattern and is not intended to limit the exemplary embodiments in any way.

The UE may support a per-FR measurement gap. For example, the UE may be configured with a FR1 specific measurement gap and a FR2 specific measurement gap. Some unconventional band combinations for NR-NR DC include FR1 and/or FR2 being used by both the PCG and the SCG. The exemplary embodiments enable the UE to determine a starting point for a per-FR measurement gap when an unconventional band combination for NR-NR DC is configured. As will be described below, the measurement gap starting point may be based on a subframe from one of the multiple component carriers (CCs). In addition, specific examples of these unconventional band combinations for NR-NR DC are described in more detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, nodes, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In one example of NR-NR DC, the UE 110 may connect to the NR RAN 120 via a PN 120A and a SN 120B. The PN 120A and the SN 120B may be connected via a non-deal backhaul (not shown). Those skilled in the art will understand that the PN 120A may be one of multiple nodes that form the PCG and the SN 120B may be one of multiple nodes that form the SCG. As mentioned above, the exemplary embodiments enable the UE to determine the per-FR measurement gap starting point when the corresponding frequency range is being used by both the PCG and the SCG.

The nodes 120A, 120B may include one or more communication interfaces to exchange data and/or information with camped UEs, the RAN 120, the cellular core network 130, the internet 140, etc. Further, the nodes 120A, 120B may include a processor configured to perform various operations. For example, the processor of the node may be configured to perform operations related to configuring a measurement gap for the UE 110. However, reference to a processor is merely for illustrative purposes. The operations of the nodes 120A, 120B may also be represented as a separate incorporated component of the cell or may be a modular component coupled to the node, e.g., an integrated circuit with or without firmware. For example, the integrated circuit may include input circuitry to receive signals and processing circuitry to process the signals and other information. In addition, in some nodes, the functionality of the processor is split among two or more processors such as a baseband processor and an applications processor. The exemplary embodiments may be implemented in any of these or other configurations of a cell.

It will be further understood that any association procedure may be performed for the UE 110 to connect to the NR RAN 120. For example, as discussed above, the NR RAN 120 may be associated with a particular cellular provider where the UE 110 and/or the user thereof has a contract and credential information (e.g., stored on a SIM card). Upon detecting the presence of the NR RAN 120, the UE 110 may transmit the corresponding credential information to associate with the NR RAN 120. More specifically, the UE 110 may associate with a specific node, cell or base station. Once associated, the NR RAN 120 may configure a particular node as a PN and then configure the UE 110 with a SN to provide DC functionality. However, as mentioned above, the use of the NR RAN 120 is for illustrative purposes and any appropriate type of RAN may be used.

In addition to the NR RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the EPC and/or the 5GC. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
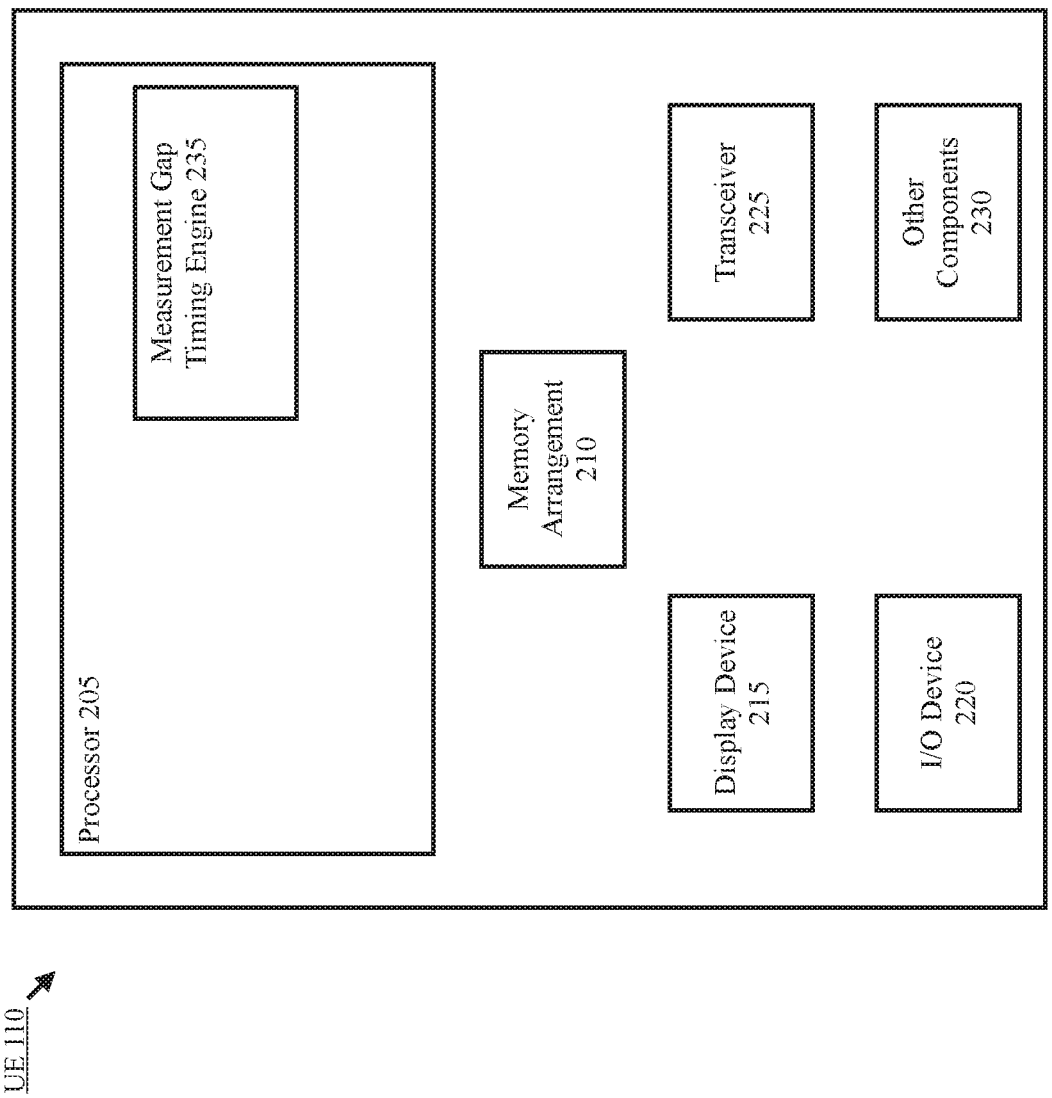
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a measurement gap timing engine 235. The measurement gap timing engine 235 may be configured to determine a measurement gap starting point for a frequency range (e.g., FR1 or FR2) specific measurement gap.

The above referenced engine 235 being an application (e.g., a program) executed by the processor 205 is only exemplary. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
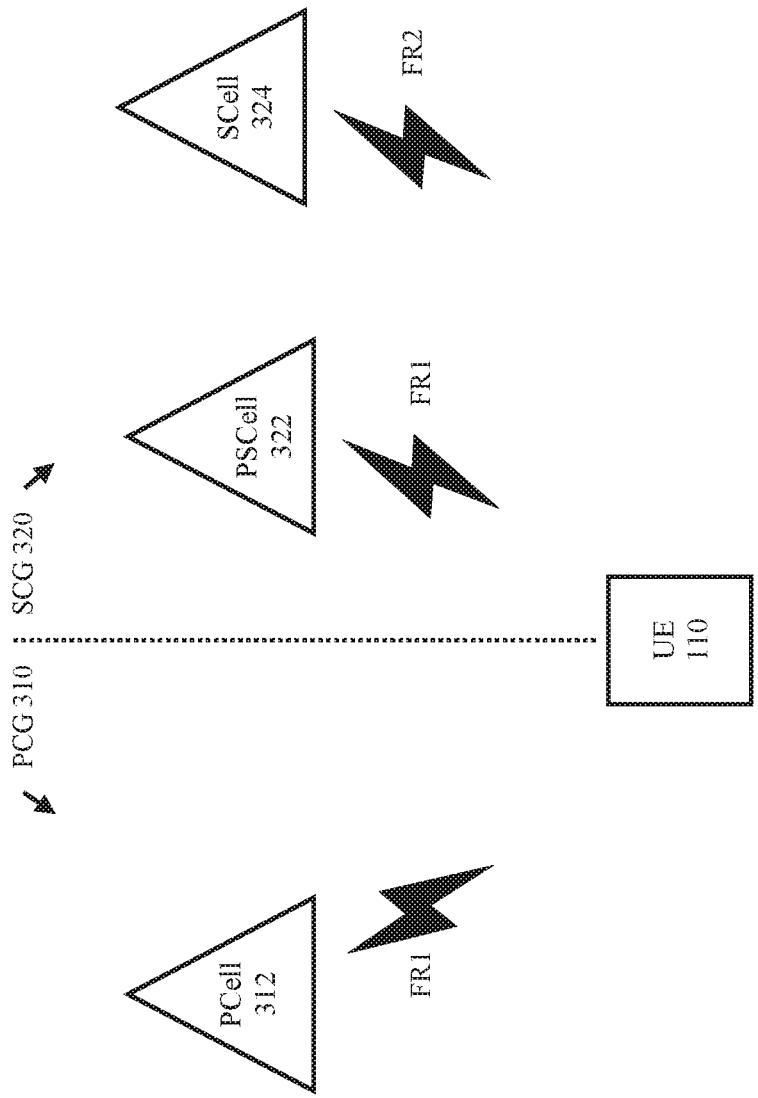
FIG. 3 shows an exemplary new radio (NR)-NR dual-connectivity (DC) arrangement according to various exemplary embodiments.

FIG. 3 shows an exemplary NR-NR DC arrangement 300 according to various exemplary embodiments. The NR-NR DC arrangement 300 will be described with regard to the network arrangement 100 of FIG. 1 and the UE 110 of FIG. 2.

The NR-NR DC arrangement 300 includes the UE 110, a PCG 310 and an SCG 320. In this example, the PCG 310 includes a primary cell (PCell) 312 that operates on FR1. The SCG 320 includes a primary secondary cell (PSCell) 322 that operates on FR1 and a secondary cell (SCell) 324 that operates on FR2. Here, the CC for the PSCell 322 operating on FR1 and the CC for the SCell 324 operating on FR2 are configured for carrier aggregation (CA).

As indicated above, the exemplary arrangement 300 may provide a band combination in which FR1 is utilized by both the PCG 310 and the SCG 320. This type of band combination is one example of an unconventional NR-NR DC band combination that may benefit from the exemplary mechanisms described herein. Specific examples of the UE 110 determining a per-FR measurement gap starting point within the context of the exemplary NR-NR DC arrangement 300 will be described below with regard to FIGS. 4-5.

Figure 4:
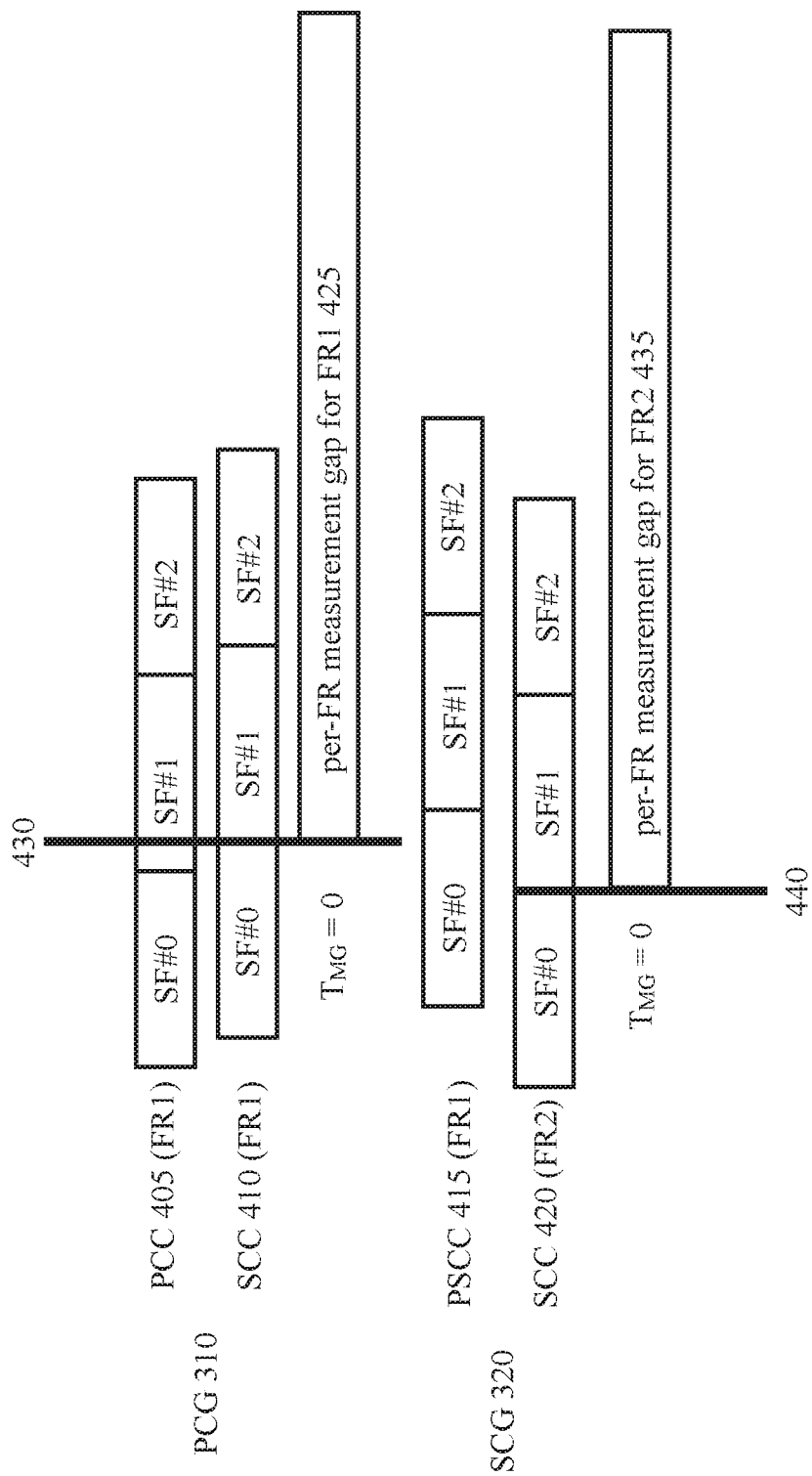
FIG. 4 illustrates a per-FR measurement gap for NR-NR DC according to various exemplary embodiments.

FIG. 4 illustrates a per-FR measurement gap for NR-NR DC according to various exemplary embodiments. FIG. 4 will be described with regard to the exemplary arrangement 300 of FIG. 3.

FIG. 4 shows that the PCG 310 may provide a primary component carrier (PCC) 405 operating on FR1 and a secondary component carrier (SCC) 410 also operating on FR1. In addition, the SCG 320 may provide a primary secondary component carrier (PSCC) 415 operating on FR1 and a SCC 420 operating on FR2. In this example, each of the CCs 405-420 are shown with a set of consecutive subframes indexed #0-#2. The subframes are intentionally depicted as partially overlapping to demonstrate that in an actual deployment scenario there may be differences between subframe timing across multiple CCs.

The example provided in FIG. 4 is merely provided for illustrative purposes and is not intended to limit the exemplary embodiments in any way. Those skilled in the art will understand that the exemplary techniques described below may be applicable to any scenario in which the PCG provides one or more serving component carriers operating on FR1 including a PCC and the SCG provides one or more serving component carriers operating on FR1 including a PSCC and at least one SCC operating on FR2.

During operation, the UE 110 may be provided with a measurement gap timing advance parameter of $T_{MG}$ milliseconds (ms). This parameter may define the approximate instance in time that is to mark the start of the per-FR measurement gap. As will be described in more detail below, the timing advance parameter may be adjusted in accordance with the boundaries of a serving cell subframe.

In one exemplary technique, if the per-FR measurement gap for FR1 425 is configured with the measurement gap timing advance of $T_{MG}$ (ms), the measurement gap for FR1 425 may start at time $T_{MG}$ (ms) advanced to the end of the latest PCG 310 subframe occurring immediately before the configured measurement gap 425 among PCG 310 serving cell subframes. Accordingly, in FIG. 4, the reference line 430 shows that the UE 110 may determine that the per-FR measurement gap for FR1 425 is to start at time $T_{MG}$ (ms) advanced to the end of SF #0 for SCC 410. In this example, the subframe from SCC 410 is selected by the UE 110.

However, in an actual deployment scenario the subframe timing may be different and any one of the PCG 310 serving cell subframes may be selected.

In another exemplary technique, if the per-FR measurement gap for FR2 435 is configured with the measurement gap timing advance of $T_{MG}$ (ms), the measurement gap for FR2 435 may start at time $T_{MG}$ (ms) advanced to the end of the latest SCG 320 FR2 subframe occurring immediately before the configured measurement gap 435 among SCG 320 FR2 serving cell subframes. Accordingly, in FIG. 4, the reference line 440 shows that the per-FR measurement gap for FR2 435 starting point is marked by time $T_{MG}$ (ms) advanced to the end of SF #0 for SCC 420. This example is described with regard to a PCG 310 that includes two CCs 405-410 and a SCG 320 that also includes twos CCs 415-420. However, this configuration of CCs is merely provided for illustrative purposes, those skilled in the art will understand how the exemplary embodiments may apply to any appropriate number of CCs.

Figure 5:
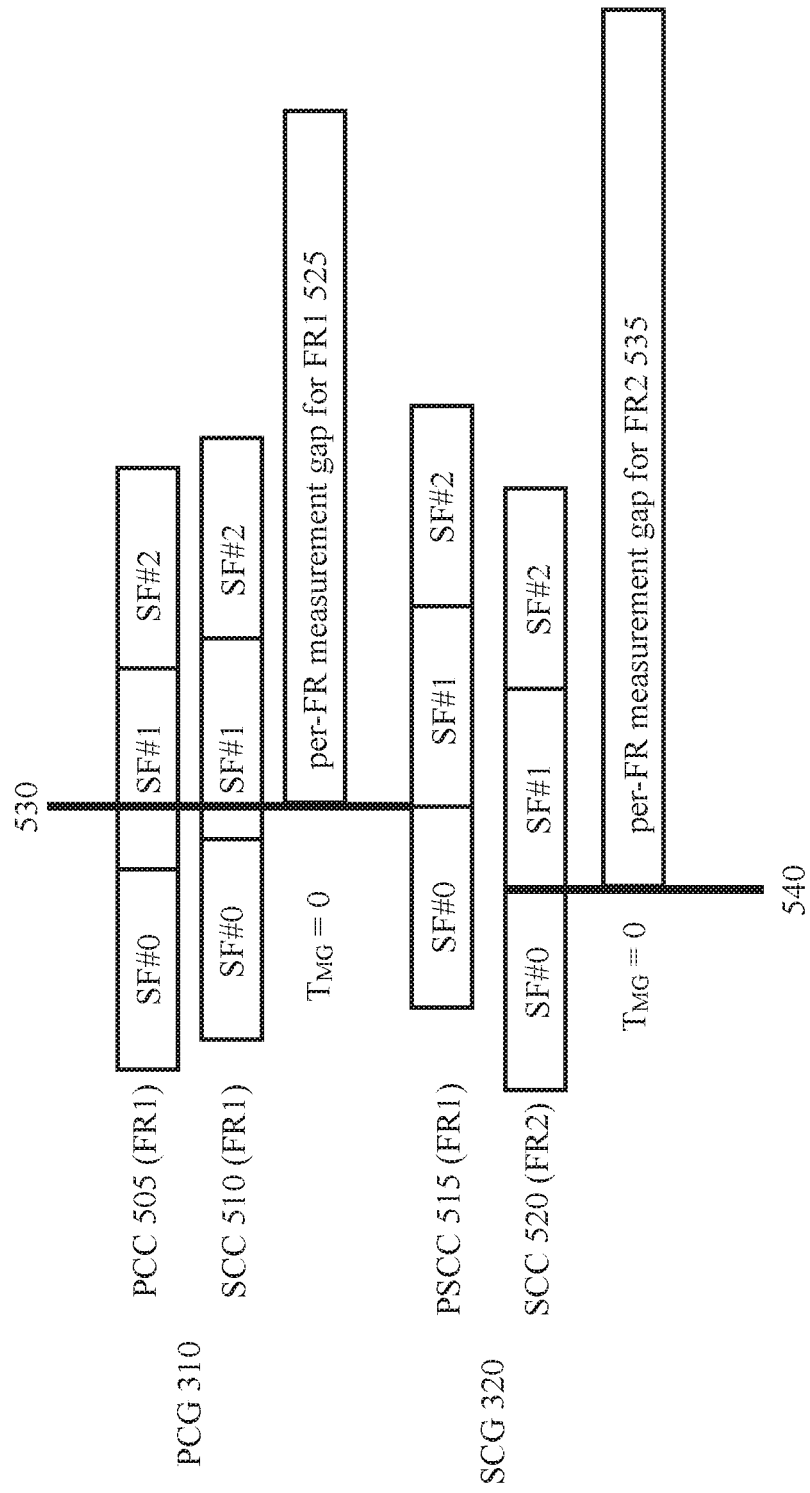
FIG. 5 illustrates a per-FR measurement gap for NR-NR DC according to various exemplary embodiments.

FIG. 5 illustrates a per-FR measurement gap for NR-NR DC according to various exemplary embodiments. FIG. 5 will be described with regard to the exemplary arrangement 300 of FIG. 3.

FIG. 5 shows that the PCG 310 may provide a PCC 505 operating on FR1 and a SCC 510 also operating on FR1. In addition, the SCG 320 may provide a PSCC 515 operating on FR1 and a SCC 520 operating on FR2. The CCs 505-520 are shown with a set of consecutive subframes indexed #0-#2. The subframes are intentionally depicted as partially overlapping to demonstrate that in an actual deployment scenario there may be differences between subframe timing across multiple CCs.

FIG. 5 is similar to FIG. 4. However, there is a difference in how the per-FR measurement gap for FR1 525 may be determined and how the per-FR measurement gap for FR1 425 may be determined. As mentioned above, those skilled in the art will understand that the exemplary techniques described below may be applicable to any scenario in which the PCG provides one or more serving component carriers operating on FR1 including a PCC and the SCG provides one or more serving component carriers operating on FR1 including a PSCC and at least one SCC operating on FR2.

Like the example provided above with regard to FIG. 4, in this example, the timing advance parameter may be adjusted in accordance with the boundaries of a serving cell subframe.

In one exemplary technique, if the per-FR measurement gap for FR1 525 is configured with the measurement gap timing advance of $T_{MG}$ (ms), the measurement gap for FR1 525 may start at time $T_{MG}$ (ms) advanced to the end of the latest FR1 serving cell subframe occurring immediately before the configured measurement gap 525 among FR1 serving cell subframes in both the PCG 310 and the SCG 320. Accordingly, in FIG. 5, the reference line 530 shows that the UE 110 may determine that the per-FR measurement gap for FR1 525 is to start at time $T_{MG}$ (ms) advanced to the end of SF #0 for PSCC 515. In this example, the subframe from PSCC 515 is selected by the UE 110. However, in an actual deployment scenario the subframe timing may be different and any one of the FR1 serving cell subframes in either the PCG or the SCG may be selected.

The reference line 540 shows that the per-FR measurement gap for FR2 535 starting point is marked by time $T_{MG}$ (ms) advanced to the end of SF #0 for SCC 520. The per-FR measurement gap for FR2 535 starting point may be selected on the same basis as described above for the per-FR measurement gap for FR2 435 starting point.

The example in FIG. 5 is described with regard to a PCG 310 that include two CCs 505-510 and a SCG 320 that also includes twos CCs 515-520. However, this configuration of CCs is merely provided for illustrative purposes, those skilled in the art will understand how the exemplary embodiments may apply to any appropriate number of CCs.

Figure 6:
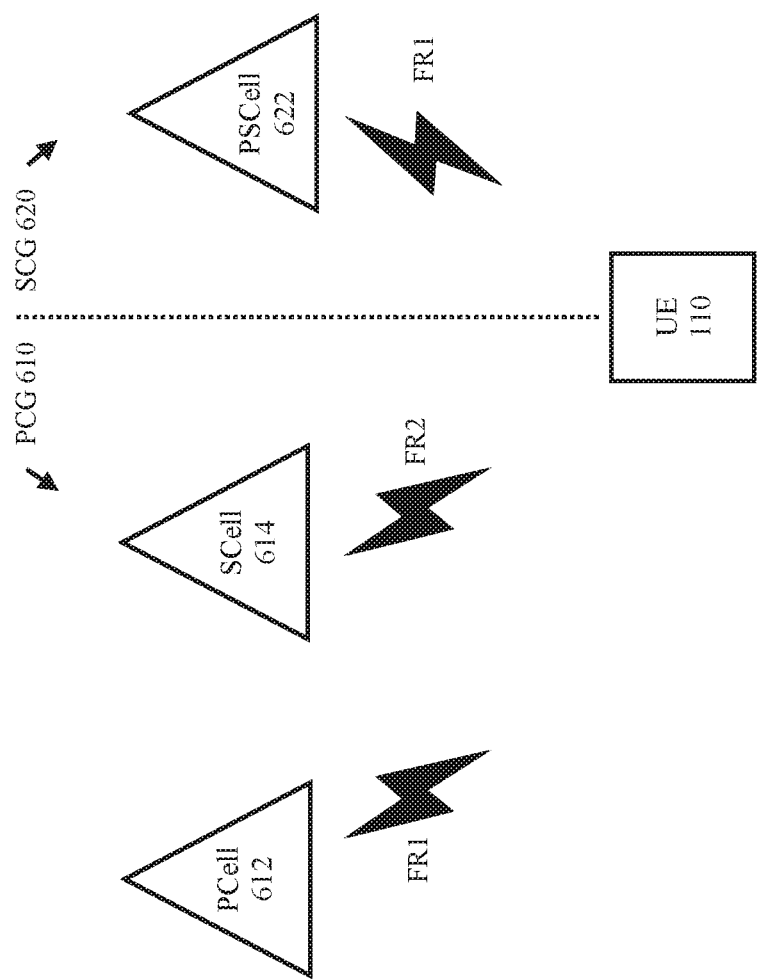
FIG. 6 shows an exemplary NR-NR DC arrangement according to various exemplary embodiments.

FIG. 6 shows an exemplary NR-NR DC arrangement 600 according to various exemplary embodiments. The NR-NR DC arrangement 600 will be described with regard to the network arrangement 100 of FIG. 1 and the UE 110 of FIG. 2.

The NR-NR DC arrangement 600 includes the UE 110, a PCG 610 and an SCG 620. In this example, the PCG 610 includes a PCell 612 that operates on FR1 and an SCell 614 that operates on FR2. The SCG 620 includes a PSCell 622 that operates on FR1. Here, the CC for the PCell 612 operating on FR1 and the CC for the SCell 614 operating on FR2 are configured for CA.

As indicated above, the exemplary arrangement 600 may provide a band combination in which FR1 is utilized by both the PCG 610 and the SCG 620. This type of band combination is one example of an unconventional NR-NR DC band combination that may benefit from the exemplary mechanisms described herein. Specific examples of the UE 110 determining a per-FR measurement gap starting point within the context of the exemplary NR-NR DC arrangement 600 will be described below in FIGS. 7-8.

Figure 7:
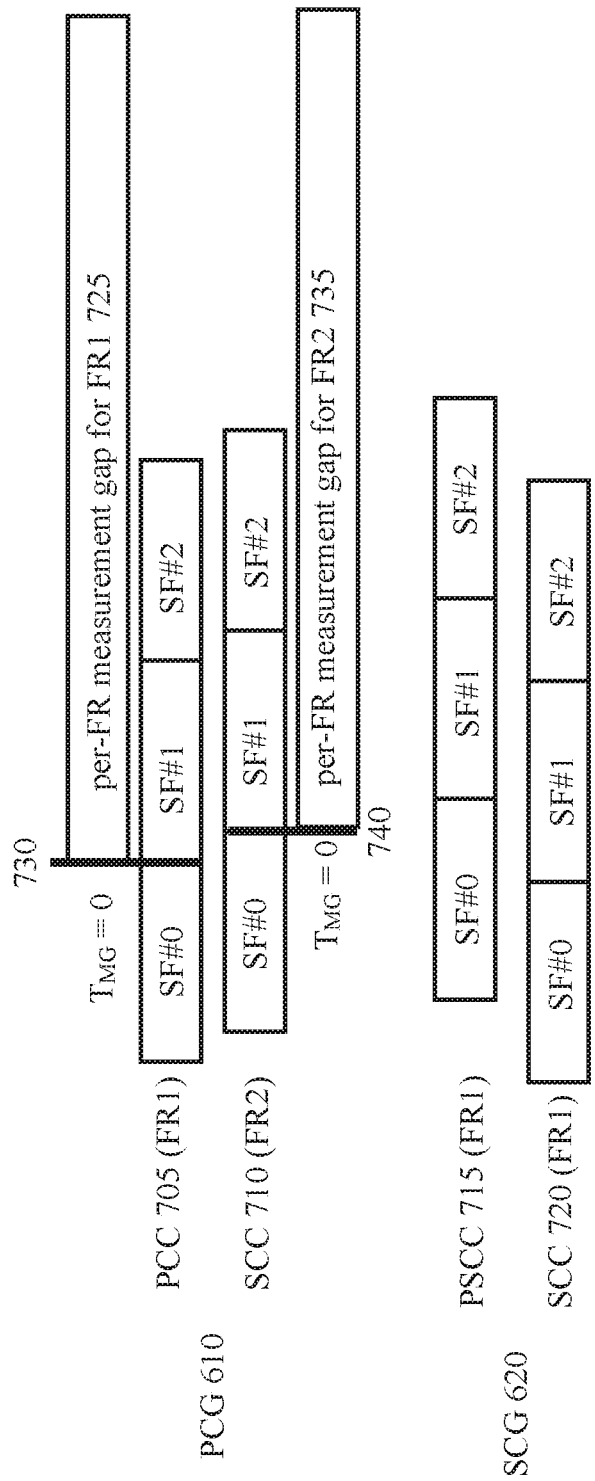
FIG. 7 illustrates a per-FR measurement gap for NR-NR DC according to various exemplary embodiments.

FIG. 7 illustrates a per-FR measurement gap for NR-NR DC according to various exemplary embodiments. FIG. 7 will be described with regard to the exemplary arrangement 600 of FIG. 6.

FIG. 7 shows that the PCG 610 may provide a PCC 705 operating on FR1 and a SCC 710 operating on FR2. In addition, the SCG 620 may provide a PSCC 715 operating on FR1 and a SCC 720 also operating on FR1. In this example, each of the CCs 705-720 are shown with a set of consecutive subframes indexed #0-#2. The subframes are intentionally depicted as partially overlapping to demonstrate that in an actual deployment scenario there may be differences between subframe timing across multiple CCs.

The example provided in FIG. 7 is merely provided for illustrative purposes and is not intended to limit the exemplary embodiments in any way. Those skilled in the art will understand that the exemplary techniques described below may be applicable to any scenario in which the PCG provides one or more serving component carriers operation on FR1 including a PCC and at least one SCC operating on FR2 and the SCG provides one or more serving component carriers operating on FR1 including a PSCC.

Like the exemplary techniques described above, in this example, the timing advance parameter may be adjusted in accordance with the boundary of a serving cell subframe. In one exemplary technique, if the per-FR measurement gap for FR1 725 is configured with the measurement gap timing advance of $T_{MG}$ (ms), the measurement gap for FR1 725 may start at time $T_{MG}$ (ms) advanced to the end of the latest PCG 610 FR1 subframe occurring immediately before the configured measurement gap 725 among PCG 610 FR1 serving cell subframes. Accordingly, in FIG. 7, the reference line 730 shows that the UE 110 may determine that the per-FR measurement gap for FR1 725 is to start at time $T_{MG}$ (ms) advanced to the end of SF #0 for PCC 705.

In another exemplary technique, if the per-FR measurement gap for FR2 735 is configured with the measurement gap timing advance of $T_{MG}$ (ms), the measurement gap for FR2 735 may start at time $T_{MG}$ (ms) advanced to the end of the latest PCG 610 FR2 subframe occurring immediately before the configured measurement gap 735 among PCG 610 FR2 serving cell subframes. Accordingly, in FIG. 7, the reference line 740 shows that the per-FR measurement gap for FR2 735 starting point is marked by time $T_{MG}$ (ms) advanced to the end of SF #0 for SCC 710. This example is described with regard to a PCG 610 that includes two CCs 705-710 and a SCG 620 that also includes twos CCs 715-720. However, this configuration of CCs is merely provided for illustrative purposes, those skilled in the art will understand how the exemplary embodiments may apply to any appropriate number of CCs.

Figure 8:
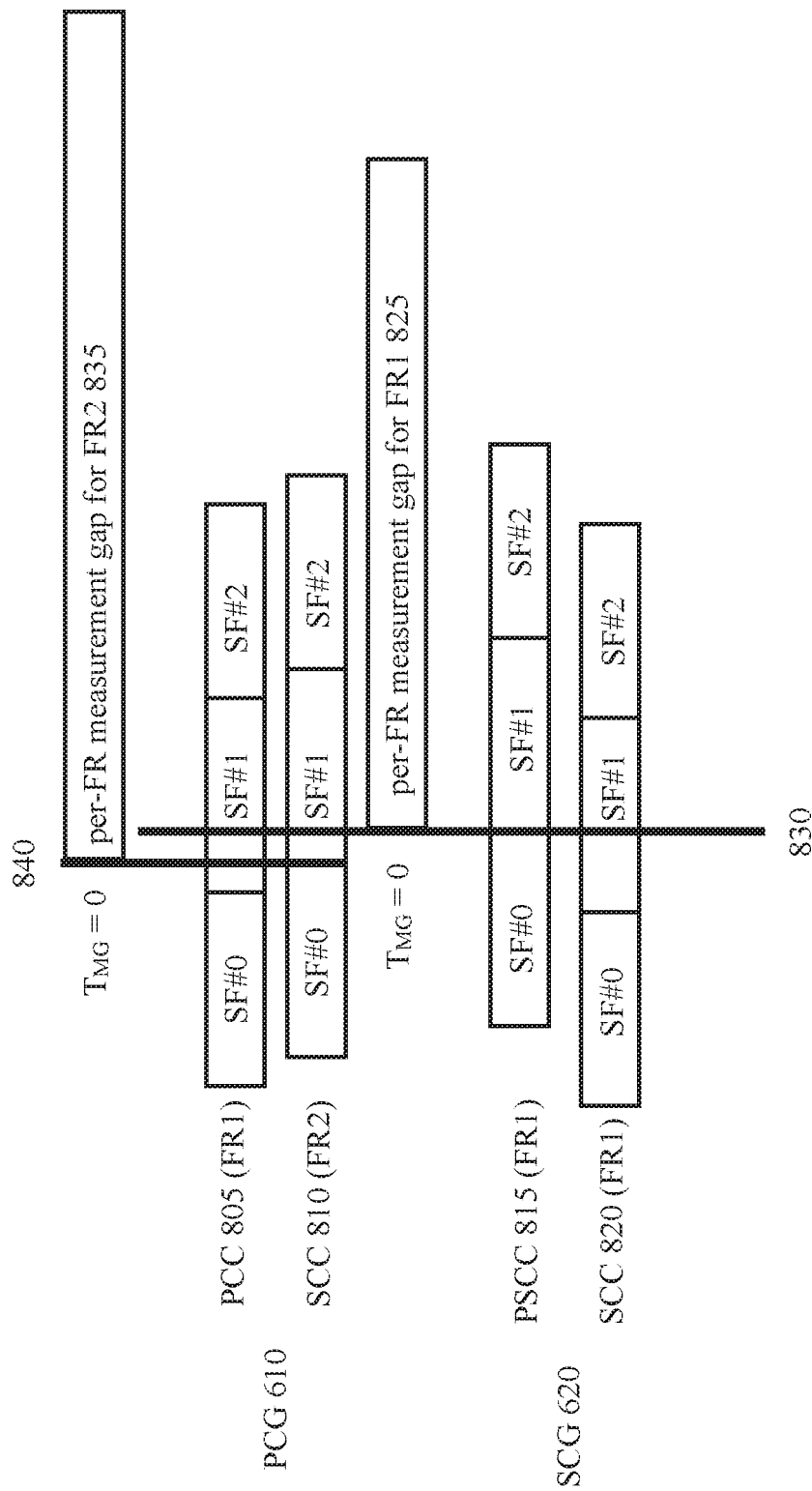
FIG. 8 illustrates a per-FR measurement gap for NR-NR DC according to various exemplary embodiments.

FIG. 8 illustrates a per-FR measurement gap for NR-NR DC according to various exemplary embodiments. FIG. 8 will be described with regard to the exemplary arrangement 600 of FIG. 3.

FIG. 8 shows that the PCG 610 may provide a PCC 805 operating on FR1 and a SCC 810 operating on FR2. In addition, the SCG 620 may provide a PSCC 815 operating on FR1 and a SCC 820 operating on FR1. The CCs 805-820 are shown with a set of consecutive subframes indexed #0-#2. The subframes are intentionally depicted as partially overlapping to demonstrate that in an actual deployment scenario there may be differences between subframe timing across multiple CCs.

FIG. 8 is similar to FIG. 7. However, there is a difference in how the per-FR measurement gap for FR1 825 may be determined and how the per-FR measurement gap for FR1 725 may be determined. As mentioned above, those skilled in the art will understand that the exemplary techniques described below may be applicable to any scenario in which the PCG provides one or more serving component carriers operation on FR1 including a PCC and at least one SCC operating on FR2 and the SCG provides one or more serving component carriers operating on FR1 including a PSCC.

Like the examples provided above, the timing advance parameter may be adjusted in accordance with the boundaries of a serving cell subframe. However, compared to the example shown in FIG. 7, the candidate subframes are from both cell groups 610-620 instead of just the PCG 610.

In accordance with one exemplary technique, if the per-FR measurement gap for FR1 825 is configured with the measurement gap timing advance of $T_{MG}$ (ms), the measurement gap for FR1 825 may start at time $T_{MG}$ (ms) advanced to the end of the latest FR1 serving cell subframe occurring immediately before the configured measurement gap 825 among FR1 serving cell subframes in both the PCG 610 and the SCG 620. Accordingly, in FIG. 8, the reference line 830 shows that the UE 110 may determine that the per-FR measurement gap for FR1 825 is to start at time $T_{MG}$ (ms) advanced to the end of SF #0 for PSCC 815. In this example, the subframe from PSCC 815 is selected by the UE 110. However, in an actual deployment scenario the subframe timing may be different and any one of the FR1 serving cell subframes (e.g., PCC 805, PSCC 815 or SCC 520) may be selected.

The reference line 840 shows that the per-FR measurement gap for FR2 835 starting point is marked by time $T_{MG}$ (ms) advanced to the end of SF #0 for SCC 810. The per-FR measurement gap for FR2 835 starting point may be selected in the same manner as the per-FR measurement gap for FR2 735 starting point described above with regard to FIG. 7.

The example in FIG. 8 is described with regard to a PCG 610 that include two CCs 805-810 and a SCG 620 that also includes twos CCs 815-820. However, this configuration of CCs is merely provided for illustrative purposes, those skilled in the art will understand how the exemplary embodiments may apply to any appropriate number of CCs.

Figure 9:
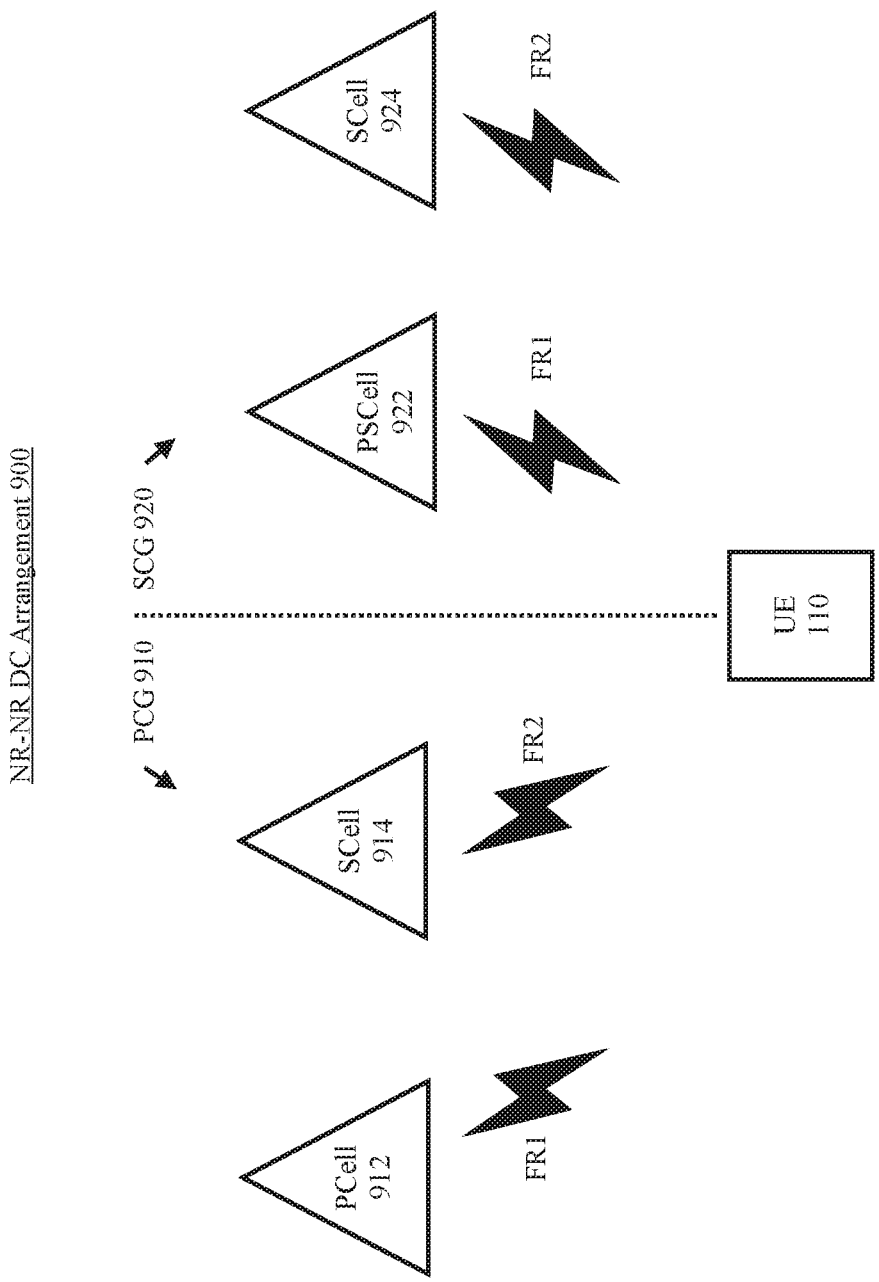
FIG. 9 shows an exemplary NR-NR DC arrangement according to various exemplary embodiments.

FIG. 9 shows an exemplary NR-NR DC arrangement 900 according to various exemplary embodiments. The NR-NR DC arrangement 900 will be described with regard to the network arrangement 100 of FIG. 1 and the UE 110 of FIG. 2.

The NR-NR DC arrangement 900 includes the UE 110, a PCG 910 and an SCG 920. In this example, the PCG 910 includes a PCell 912 that operates on FR1 and an SCell 914 that operates on FR2. The SCG 920 includes a PSCell 922 that operates on FR1 and a SCell 924 that operates on FR2. Here, the CC for the PCell 912 operating on FR1 and the CC for the SCell 914 operating on FR2 are configured for CA. In addition, the CC for the PSCell 922 operating on FR1 and the CC for the SCell 924 operating on FR2 are also configured for CA.

As indicated above, the exemplary arrangement 900 may provide a band combination in which both FR1 and FR2 are utilized by both the PCG 910 and the SCG 920. This type of band combination is one example of an unconventional NR-NR DC band combination that may benefit from the exemplary mechanisms described herein. Specific examples of the UE 110 determining a per-FR measurement gap starting point within the context of the exemplary NR-NR DC arrangement 900 will be described below with regard to FIGS. 10-12.

Figure 10:
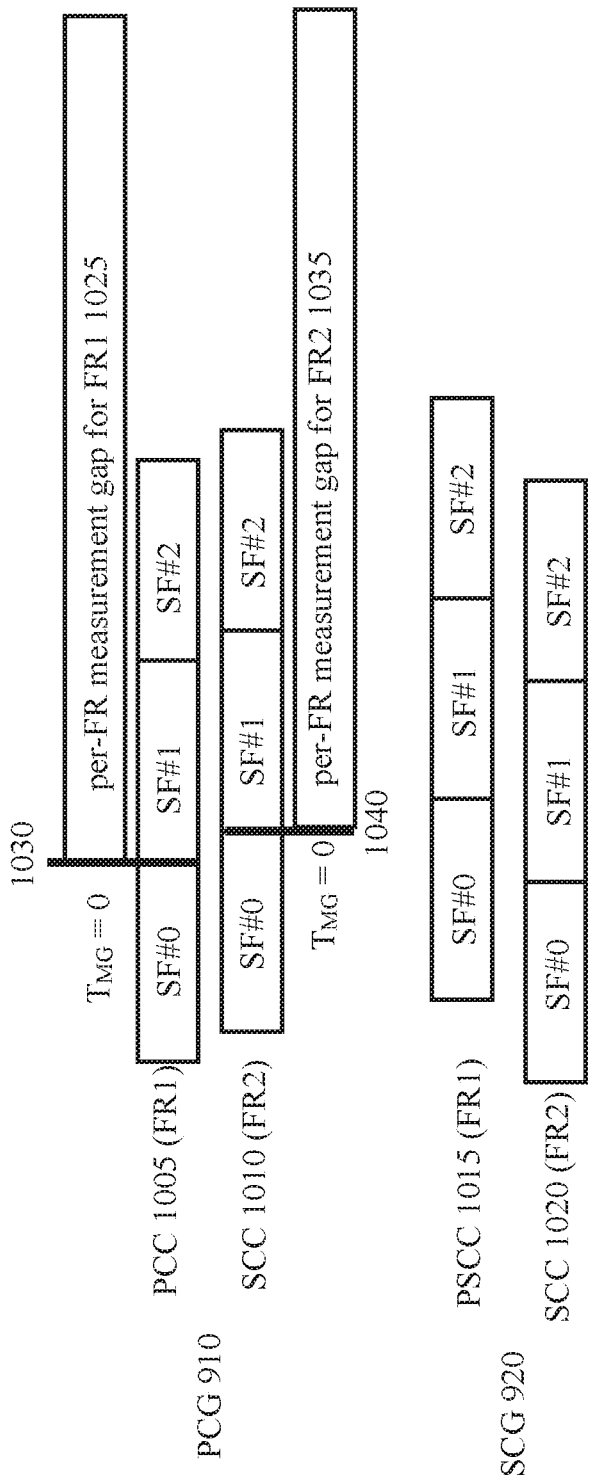
FIG. 10 illustrates a per-FR measurement gap for NR-NR DC according to various exemplary embodiments.

FIG. 10 illustrates a per-FR measurement gap for NR-NR DC according to various exemplary embodiments. FIG. 10 will be described with regard to the exemplary arrangement 900 of FIG. 9.

FIG. 10 shows that the PCG 910 may provide a PCC 10005 operating on FR1 and a SCC 1010 operating on FR2. In addition, the SCG 920 may provide a PSCC 1015 operating on FR1 and a SCC 1020 operating on FR2. In this example, each of the CCs 1005-1020 are shown with a set of consecutive subframes indexed #0-#2. The subframes are intentionally depicted as partially overlapping to demonstrate that in an actual deployment scenario there may be differences between subframe timing across multiple CCs.

The example provided in FIG. 10 is merely provided for illustrative purposes and is not intended to limit the exemplary embodiments in any way. Those skilled in the art will understand that the exemplary techniques described below may be applicable to any scenario in which the PCG provides one or more serving component carriers operating on FR1 including a PCC and at least one SCC operating on FR2 and the SCG provides one or more serving component carriers operating on FR1 including a primary PSCC and at least one SCC operating on FR2.

Like the exemplary techniques described above, the timing advance parameter may be adjusted in accordance with the boundaries of a serving cell subframe. In one exemplary technique, if the per-FR measurement gap for FR1 1025 is configured with the measurement gap timing advance of $T_{MG}$ (ms), the measurement gap for FR1 1025 may start at time $T_{MG}$ (ms) advanced to the end of the latest PCG 910 FR1 subframe occurring immediately before the configured measurement gap 1025 among PCG 910 FR1 serving cell subframes. Accordingly, in FIG. 10, the reference line 1030 shows that the UE 110 may determine that the per-FR measurement gap for FR1 1025 is to start at time $T_{MG}$ (ms) advanced to the end of SF #0 for PCC 1005.

In accordance with another exemplary technique, if the per-FR measurement gap for FR2 1035 is configured with the measurement gap timing advance of $T_{MG}$ (ms), the measurement gap for FR2 1035 may start at time $T_{MG}$ (ms) advanced to the end of the latest PCG 910 FR2 subframe occurring immediately before the configured measurement gap 1035 among PCG 910 FR2 serving cell subframes. Accordingly, in FIG. 10, the reference line 1040 shows that the per-FR measurement gap for FR2 1035 starting point is marked by time $T_{MG}$ (ms) advanced to the end of SF #0 for SCC 1010. This example is described with regard to a PCG 910 that includes two CCs 1005-1010 and a SCG 920 that also includes twos CCs 1015-1020. However, this configuration of CCs is merely provided for illustrative purposes, those skilled in the art will understand how the exemplary embodiments may apply to any appropriate number of CCs.

Figure 11:
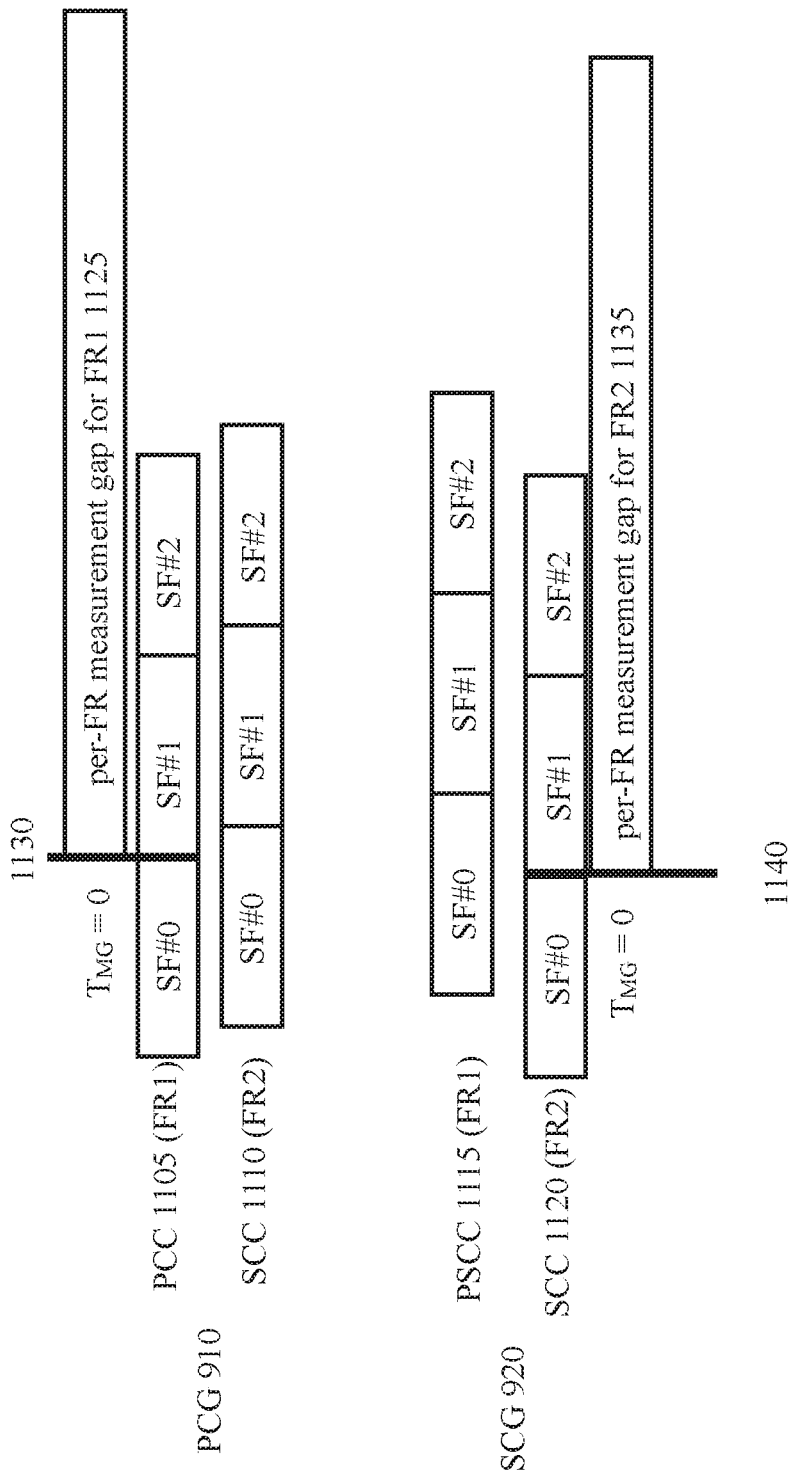
FIG. 11 illustrates a per-FR measurement gap for NR-NR DC according to various exemplary embodiments.

FIG. 11 illustrates a per-FR measurement gap for NR-NR DC according to various exemplary embodiments. FIG. 11 will be described with regard to the exemplary arrangement 900 of FIG. 9.

FIG. 11 shows that the PCG 910 may provide a PCC 1105 operating on FR1 and a SCC 1110 operating on FR2. In addition, the SCG 920 may provide a PSCC 1115 operating on FR1 and a SCC 1120 operating on FR2. In this example, each of the CCs 1105-1120 are shown with a set of consecutive subframes indexed #0-#2. The subframes are intentionally depicted as partially overlapping to demonstrate that in an actual deployment scenario there may be differences between subframe timing across multiple CCs.

Those skilled in the art will understand that the exemplary techniques described below may be applicable to any scenario in which the PCG provides one or more serving component carriers operating on FR1 including a PCC and at least one SCC operating on FR2 and the SCG provides one or more serving component carriers operating on FR1 including a primary PSCC and at least one SCC operating on FR2.

Like the exemplary techniques described above, the timing advance parameter may be adjusted in accordance with the boundaries of a serving cell subframe. In one exemplary technique, if the per-FR measurement gap for FR1 1125 is configured with the measurement gap timing advance of $T_{MG}$ (ms), the measurement gap for FR1 1125 may start at time $T_{MG}$ (ms) advanced to the end of the latest PCG 910 FR1 subframe occurring immediately before the configured measurement gap 1125 among PCG 910 FR1 serving cell subframes. Accordingly, in FIG. 11, the reference line 1130 shows that the UE 110 may determine that the per-FR measurement gap for FR1 1125 is to start at time $T_{MG}$ (ms) advanced to the end of SF #0 for PCC 1105.

In accordance with another exemplary technique, if the per-FR measurement gap for FR2 1135 is configured with the measurement gap timing advance of $T_{MG}$ (ms), the measurement gap for FR2 1135 may start at time $T_{MG}$ (ms) advanced to the end of the latest SCG 920 FR2 subframe occurring immediately before the configured measurement gap 1135 among SCG 920 FR2 serving cell subframes. Accordingly, in FIG. 11, the reference line 1140 shows that the per-FR measurement gap for FR2 1135 starting point is marked by time $T_{MG}$ (ms) advanced to the end of SF #0 for SCC 1120. This example is described with regard to a PCG 910 that includes two CCs 1105-1110 and a SCG 920 that also includes twos CCs 1115-1120. However, this configuration of CCs is merely provided for illustrative purposes, those skilled in the art will understand how the exemplary embodiments may apply to any appropriate number of CCs.

Figure 12:
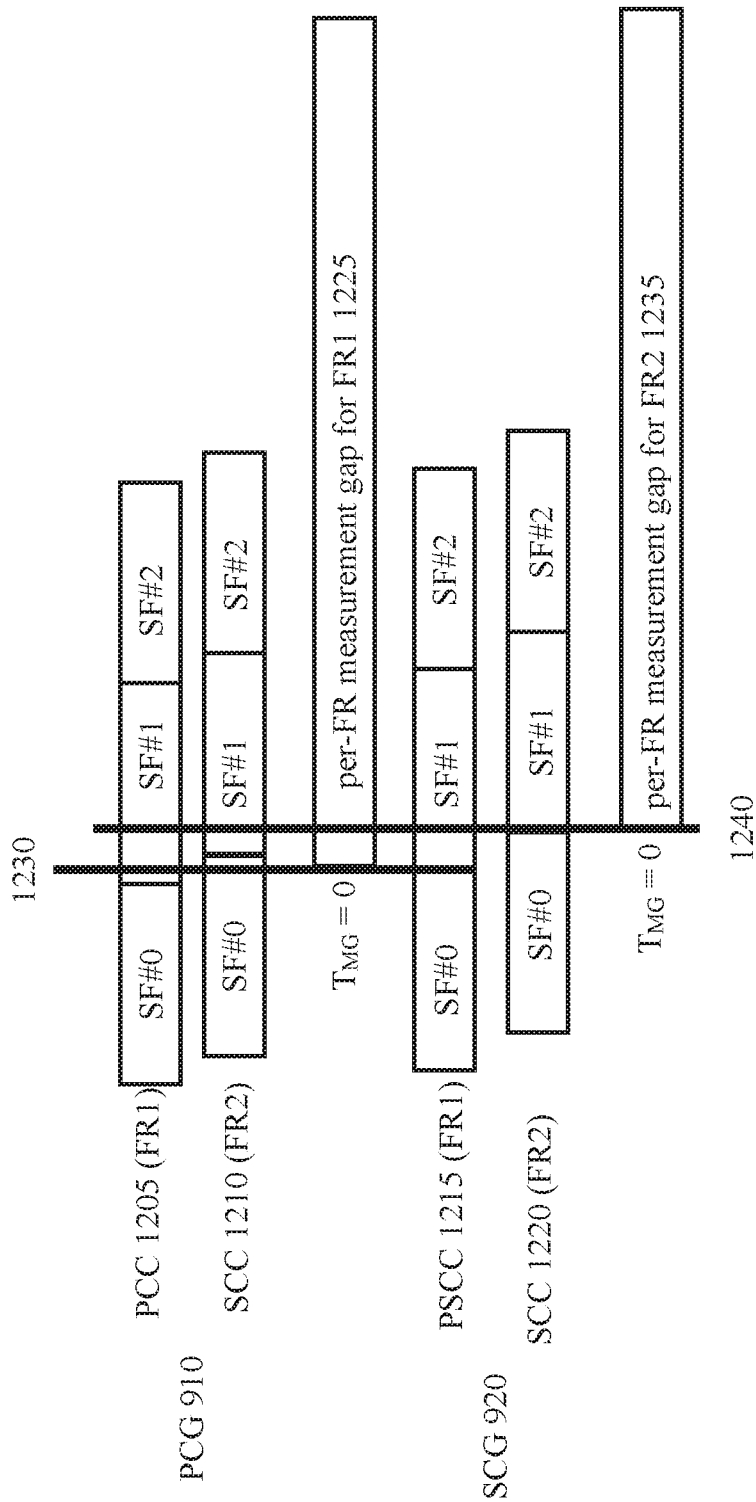
FIG. 12 illustrates a per-FR measurement gap for NR-NR DC according to various exemplary embodiments.

FIG. 12 illustrates a per-FR measurement gap for NR-NR DC according to various exemplary embodiments. FIG. 12 will be described with regard to the exemplary arrangement 900 of FIG. 9.

FIG. 12 shows that the PCG 910 may provide a PCC 1205 operating on FR1 and a SCC 1210 operating on FR2. In addition, the SCG 920 may provide a PSCC 1215 operating on FR1 and a SCC 1220 operating on FR2. The CCs 1205-1220 are shown with a set of consecutive subframes indexed #0-#2. The subframes are intentionally depicted as partially overlapping to demonstrate that in an actual deployment scenario there may be differences between subframe timing across multiple CCs.

FIG. 12 is similar to FIGS. 10-11. However, there is a difference in how the starting point of the per-FR measurement gaps 1225, 1235 may be determined compared to the per-FR measurement gaps described above with regard to FIGS. 10-11.

Those skilled in the art will understand that the exemplary techniques described below may be applicable to any scenario in which the PCG provides one or more serving component carriers operating on FR1 including a PCC and at least one SCC operating on FR2 and the SCG provides one or more serving component carriers operating on FR1 including a primary PSCC and at least one SCC operating on FR2.

Like the examples provided above, the timing advance parameter may be adjusted in accordance with the boundaries of a serving cell subframe. However, the candidate subframes are from both cell groups 910-920 instead of just the PCG 910 or the SCG 920.

In one exemplary technique, if the per-FR measurement gap for FR1 1225 is configured with the measurement gap timing advance of $T_{MG}$ (ms), the measurement gap for FR1 1225 may start at time $T_{MG}$ (ms) advanced to the end of the latest FR1 serving cell subframe occurring immediately before the configured measurement gap 1225 among FR1 serving cell subframes in both the PCG 910 and the SCG 920. Accordingly, in FIG. 12, the reference line 1230 shows that the UE 110 may determine that the per-FR measurement gap for FR1 1225 is to start at time $T_{MG}$ (ms) advanced to the end of SF #0 for PSCC 1215. In this example, the subframe from PSCC 1215 is selected by the UE 110. However, in an actual deployment scenario the subframe timing may be different and any one of the FR1 serving cell subframes from either cell group may be selected.

In accordance with another exemplary technique, if the per-FR measurement gap for FR2 1235 is configured with the measurement gap timing advance of $T_{MG}$ (ms), the measurement gap for FR2 1235 may start at time $T_{MG}$ (ms) advanced to the end of the latest FR2 serving cell subframe occurring immediately before the configured measurement gap 1235 among FR2 serving cell subframes in both the PCG 910 and the SCG 920. Accordingly, in FIG. 12, the reference line 1240 shows that the UE 110 may determine that the per-FR measurement gap for FR2 1235 is to start at time $T_{MG}$ (ms) advanced to the end of SF #0 for SCC 1220. In this example, the subframe from SCC 1220 is selected by the UE 110. However, in an actual deployment scenario the subframe timing may be different and any one of the FR2 serving cell subframes may be selected.

The example in FIG. 12 is described with regard to a PCG 910 that include two CCs 1205-1210 and a SCG 920 that also includes twos CCs 1215-1220. However, this configuration of CCs is merely provided for illustrative purposes, those skilled in the art will understand how the exemplary embodiments may apply to any appropriate number of CCs.

The examples described above all relate to the UE 110 determining the starting point of a per-FR measurement gap based on a measurement gap timing advance parameter (e.g., $T_{MG}$) and a serving cell subframe. In some embodiments, the UE 110 is to implement these exemplary techniques when a relevant band combination is configured. Thus, the UE 110 may perform these operations without being explicitly instructed to do so by the network. In other embodiments, the UE 110 may implement these exemplary techniques in response to any appropriate explicit or implicit condition.

Another option for implementing a per-FR measurement gap for NR-NR DC band combinations in which FR1 and/or FR2 is used by both the PCG and the SCG includes a mechanism where the network indicates which serving cell or which cell group should be the reference for determining the measurement gap starting point for each per-FR measurement gap. This mechanism will be described in more detail below with regard to the signaling diagram 1300 of FIG. 13.

Figure 13:
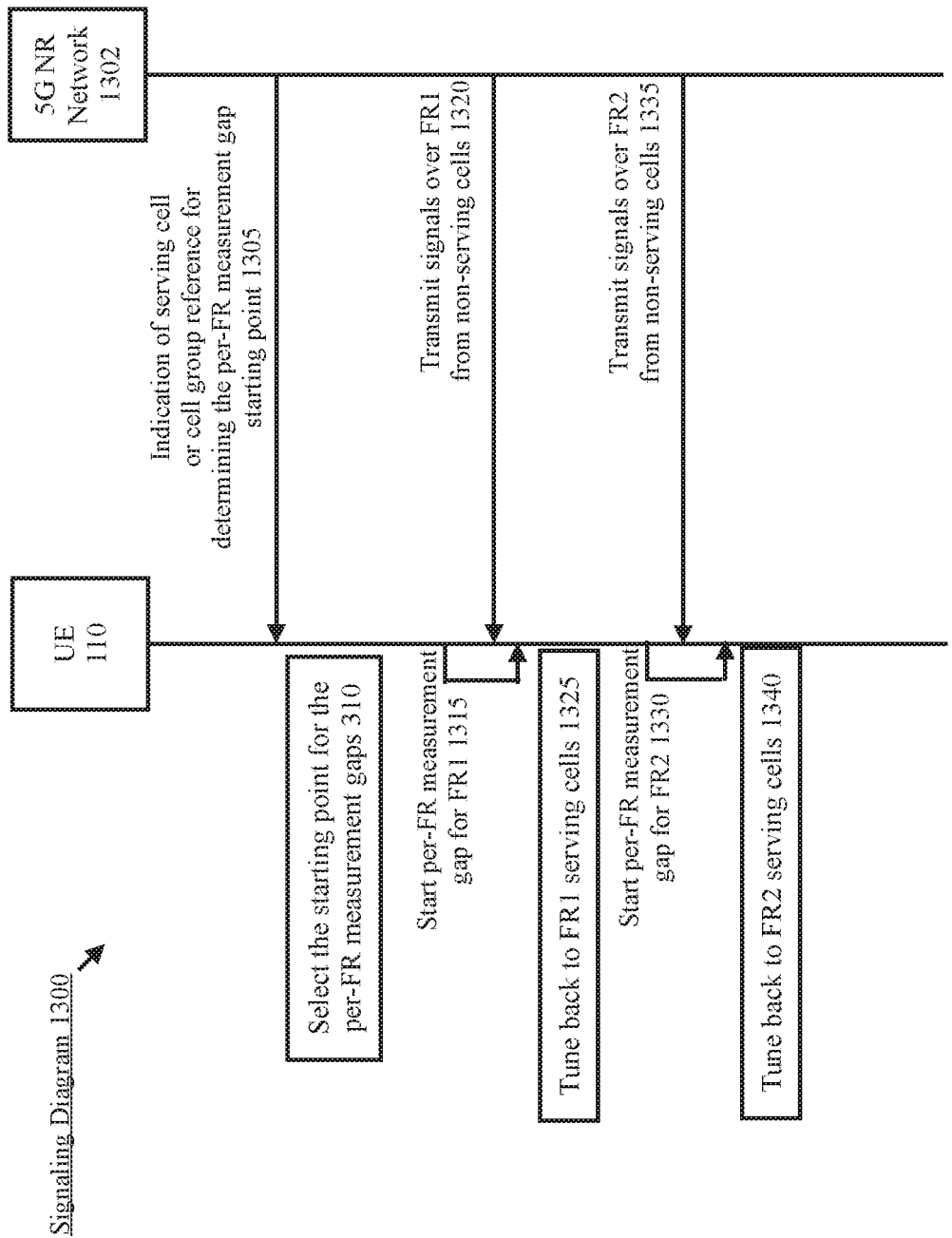
FIG. 13 shows a signaling diagram for per-FR measurement gap configuration according to various exemplary embodiments.

FIG. 13 shows a signaling diagram 1300 for per-FR measurement gap configuration according to various exemplary embodiments. The signaling diagram 1300 includes the UE 110 and 5G NR network 1302 and may be applicable to any of the band combinations described above with regards to FIG. 3, 6 or 9 or any other band combination sharing the characteristics of the described band combinations.

In 1305, the 5G NR network 1302 transmits one or more signals to the UE 110 indicating which serving cell or which cell group is the reference for determining the measurement gap starting point for each per-FR measurement gap.

In some exemplary embodiments, the indication provided in 1305 may be included in measurement gap configuration information provided via radio resource control (RRC) signaling. In other exemplary embodiments, the indication may be based on an RRC signal and downlink control information (DCI). For example, a first signal may be provided via RRC signaling that includes a reference list of multiple subframes corresponding to one or more cell groups and a second signal may be provided via DCI that indicates the index on the reference list that is to be used to determine the measurement gap starting point for a per-FR measurement gap. In further embodiments, the indication may be provided via a medium access control (MAC) control element (CE) in an SCell activation command. However, the above examples are merely provided for illustrative purposes. The exemplary embodiments may apply to this type of indication being provided via any appropriate type of signaling.

In 1310, the UE 110 selects a FR1 serving cell subframe to use as the measurement gap starting point for the per-FR measurement gap for FR1 and a FR2 serving cell subframe to use as the measurement gap starting point for the per-FR measurement gap for FR2. The UE 110 may perform the selection based on the indication received in 1305.

In 1315, the UE 110 starts the per-FR measurement gap for FR1 immediately after the selected subframe ends. In 1320, the 5G NR network 1302 transmits one or more signals over FR1 from non-serving cells during the per-FR measurement gap for FR1. The UE 110 may collect measurement data from non-serving cells operating on FR1 based on the signals received during the per-FR measurement gap for FR1. In 1325, the UE 110 tunes back to its FR1 serving cells after the duration of the measurement gap expires.

In 1330, the UE 110 starts the per-FR measurement gap for FR2 immediately after the selected subframe ends. In 1335, the 5G NR network 1302 transmits one or more signals over FR2 from non-serving cells during the per-FR measurement gap for FR2. The UE 110 may collect measurement data from non-serving cells operating on FR2 based on the signals received during the per-FR measurement gap for FR2. In 1340, the UE 110 tunes back to its FR2 serving cells after the duration of the measurement gap expires.

The timing shown in the signaling diagram 1300 is merely provided for illustrative purposes. The per-FR measurement gaps for FR1 and FR2 may be operated independently from one another. Therefore, in some embodiments, these measurement gaps may overlap in time.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A processor of a user equipment (UE) configured to perform operations comprising:
    establishing a network connection, the network connection including a new radio (NR)-NR dual connectivity band combination wherein a primary cell (PCell) of a primary cell group (PCG) and a primary secondary cell (PSCell) of a secondary cell group (SCG) both operate on frequency range 1 (FR1) and wherein at least one cell of either the PCG or the SCG operates on frequency range 2 (FR2);
    receiving a measurement gap timing advance parameter;
    selecting one subframe from multiple serving cell subframes; and
    determining a starting point for a configured per-frequency range (FR) measurement gap based on the measurement gap timing advance parameter and the selected subframe.

2. The processor of claim 1, wherein the PCG provides one or more serving component carriers operating on FR1 including a primary component carrier (PCC) and wherein the SCG provides one or more serving component carriers operating on FR1 including a primary secondary component carrier (PSCC) and at least one SCC operating on FR2.

3. The processor of claim 1, wherein the PCG provides one or more serving component carriers operating on FR1 including a primary component carrier (PCC) and at least one secondary component carriers (SCC) operating on FR2 and wherein the SCG provides one or more serving component carriers operating on FR1 including a primary secondary component carrier (PSCC).

4. The processor of claim 3, wherein the configured per-FR measurement gap is for FR1,
wherein the starting point is an end of a latest FR1 serving cell subframe occurring immediately before the configured per-FR measurement gap, and
wherein the multiple serving cell subframes include FR1 serving cell subframes from both the PCG and the SCG.

5. The processor of claim 3, wherein the configured per-FR measurement gap is for FR1,
wherein the starting point is an end of a latest PCG FR1 serving cell subframe occurring immediately before the configured per-FR measurement gap, and
wherein the multiple serving cell subframes include FR1 serving cell subframes from the PCG.

6. The processor of claim 3, wherein the configured per-FR measurement gap is for FR2,
wherein the starting point is an end of a latest PCG FR2 serving cell subframe occurring immediately before the configured per-FR measurement gap, and
wherein the multiple serving cell subframes only include FR2 serving cell subframes from the PCG.

7. The processor of claim 1, wherein the PCG provides one or more serving component carriers operating on FR1 including a primary component carrier (PCC) and at least one secondary component carrier (SCC) operating on FR2 and wherein the SCG provides one or more serving component carriers operating on FR1 including a primary secondary component carrier (PSCC) and at least one SCC operating on FR2.

8. The processor of claim 7, wherein the configured per-FR measurement gap is for FR1,
wherein the starting point is an end of a latest FR1 serving cell subframe occurring immediately before the configured per-FR measurement gap, and
wherein the multiple serving cell subframes include FR1 serving cell subframes from both the PCG and the SCG.

9. The processor of claim 7, wherein the configured per-FR measurement gap is for FR2,
wherein the starting point is an end of a latest FR2 serving cell subframe occurring immediately before the configured per-FR measurement gap, and
wherein the multiple serving cell subframes include FR2 serving cell subframes from both the PCG and the SCG.

10. The processor of claim 7, wherein the configured per-FR measurement gap is for FR1,
wherein the starting point is an end of a latest PCG FR1 serving cell subframe occurring immediately before the configured per-FR measurement gap, and
wherein the multiple serving cell subframes include FR1 serving cell subframes from the PCG.

11. The processor of claim 7, wherein the configured per-FR measurement gap is for FR2,
wherein the starting point is an end of a latest PCG FR2 serving cell subframe occurring immediately before the configured per-FR measurement gap, and
wherein the multiple serving cell subframes only include FR2 serving cell subframes from the PCG.

12. The processor of claim 7, wherein the configured per-FR measurement gap is for FR2,
wherein the starting point is a end of a latest SCG FR2 serving cell subframe occurring immediately before the configured per-FR measurement gap, and
wherein the multiple serving cell subframes only include FR2 serving cell subframes from the SCG.

13. A user equipment (UE), comprising:
a transceiver configured to communicate with a fifth generation (5G) network; and
a processor communicatively coupled to the transceiver and configured to perform operations comprising:
establishing a network connection, the network connection including a new radio (NR)-NR dual connectivity band combination wherein a primary cell (PCell) of a primary cell group (PCG) and a primary secondary cell (PSCell) of a secondary cell group (SCG) both operate on frequency range 1 (FR1) and wherein at least one cell of either the PCG or the SCG operates on frequency range 2 (FR2);
receiving a measurement gap timing advance parameter;
selecting one subframe from multiple serving cell subframes; and
determining a starting point for a configured per-frequency range (FR) measurement gap based on the measurement gap timing advance parameter and the selected subframe.

14. The UL of claim 13, wherein the PCG provides one or more serving component carriers operating on FR1 including a primary component carrier (PCC) and wherein the SCG provides one or more serving component carriers operating on FR1 including a primary secondary component carrier (PSCC) and at least one SCC operating on FR2.

15. The UE of claim 13, wherein the PCG provides one or more serving component carriers operation on FR1 including a primary component carrier (PCC) and at least one secondary component carriers (SCC) operating on FR2 and wherein the SCG provides one or more serving component carriers operating on FR1 including a primary secondary component carrier (PSCC).

16. The UE of claim 13, wherein the PCG provides one or inure serving component carriers operating on FR1 including a primary component carrier (PCC) and at least one secondary component carrier (SCC) operating on FR2 and wherein the SCG provides one or more serving component carriers operating on FR1 including a primary secondary component carrier (PSCC) and at least one SCC operating on FR2.

17. A processor of a user equipment (UE) configured to perform operations comprising:
establishing a network connection, the network connection including a new radio (NR)-NR dual connectivity band combination wherein a primary cell (PCell) of a primary cell group (PCG) and a primary secondary cell (PSCell) of a secondary cell group (SCG) both operate on frequency range 1 (FR1) and wherein at least one cell of either the PCG or the SCG operates on frequency range 2 (FR2);
receiving an indication from the network of a serving cell or cell group that is to be used as a reference for determining a per-FR measurement gap starting point; and
selecting the per-FR starting point.

18. The processor of claim 17, wherein the PCG provides one or more serving component carriers operating on FR1 including a primary component carrier (PCC), wherein the SCG provides one or more serving component carriers operating on FR1 including a primary secondary component carrier (PSCC) and at least one SCC operating on FR2, and wherein the indication is received via one of i) radio resource control (RRC) signaling, ii) a combination RRC signaling and downlink control information (DCI) or HD a medium access control (MAC) control element (CE) in a SCell activation command.

19. The processor of claim 17, wherein the PCG provides one or more serving component carriers operation on FR1 including a primary component carrier (PCC) and at least one secondary component carriers (SCC) operating on FR2, wherein the SCG provides one or more serving component carriers operating on FR1 including a primary secondary component carrier (PSCC), wherein the indication is received via one of i) radio resource control (RRC) signaling, ii) a combination RRC signaling and downlink control information (DCI) or iii) a medium access control (MAC) control element (CE) in a SCell activation command.

20. The processor of claim 17, wherein the PCG provides one or more serving component carriers operating on FR1 including a primary component carrier (PCC) and at least one secondary component carrier (SCC) operating on FR2, wherein the SCG provides one or more serving component carriers operating on FR1 including a primary secondary component carrier (PSCC) and at least one SCC operating on FR2, and wherein the indication is received via one of i) radio resource control (RRC) signaling, ii) a combination RRC signaling and downlink control information (DCI) or iii) a medium access control (MAC) control element (CE) in a SCell activation command.

* * * * *